United States Patent [19]
Takano

[11] Patent Number: 5,884,301
[45] Date of Patent: Mar. 16, 1999

[54] HYPERMEDIA SYSTEM

[75] Inventor: Hajime Takano, Tokyo, Japan

[73] Assignee: NEC Corporation, Tokyo, Japan

[21] Appl. No.: 783,077

[22] Filed: Jan. 15, 1997

[30] Foreign Application Priority Data

Jan. 16, 1996 [JP] Japan .................................. 8-023319

[51] Int. Cl.6 .................................................. G06F 17/30
[52] U.S. Cl. .......................................................... 707/3
[58] Field of Search ................................................ 707/3

[56] References Cited

U.S. PATENT DOCUMENTS

| | | | |
|---|---|---|---|
| 5,517,605 | 5/1996 | Wolf | 395/200.6 |
| 5,600,831 | 2/1997 | Levy et al. | 707/2 |
| 5,623,652 | 4/1997 | Vora et al. | 707/10 |
| 5,625,818 | 4/1997 | Zarmer et al. | 707/104 |
| 5,675,721 | 10/1997 | Freedman et al. | 345/502 |
| 5,701,451 | 12/1997 | Rogers et al. | 707/1 |
| 5,708,825 | 1/1998 | Sotomayor | 707/501 |
| 5,712,979 | 1/1998 | Graber et al. | 395/200.54 |
| 5,748,954 | 5/1998 | Mauldin | 707/10 |
| 5,764,906 | 6/1998 | Edelstein et al. | 395/200.49 |
| 5,768,578 | 6/1998 | Kirk et al. | 707/100 |
| 5,768,581 | 6/1998 | Cochran | 707/104 |
| 5,778,367 | 7/1998 | Wesinger et al. | 707/10 |
| 5,784,608 | 7/1998 | Meske, Jr. et al. | 707/2 |
| 5,793,966 | 8/1998 | Amstein et al. | 395/200.33 |

FOREIGN PATENT DOCUMENTS 7-44447  2/1995  Japan .

OTHER PUBLICATIONS

T. Berners–Lee et al., "The World Wide Web", Communication of the ACM, vol. 37, No. 8, (Aug. 1994), pp. 76–82.

*Primary Examiner*—Wayne Amsbury
*Attorney, Agent, or Firm*—Foley & Lardner

[57] ABSTRACT

A hypermedia system comprises a client computer, server computers for holding contents files, and a directory server computer for intensively managing information about the contents files. These computers are connected via a network. The directory server computer includes a directory information storage means for storing node identifiers, information about the contents of the contents files which are nodes, and information about the linkage relationship between the nodes with respect to the nodes managed by the server computers and a retrieval means for retrieving information stored in the directory information storage means based on a request from the client computer to sending it to the client computer.

14 Claims, 7 Drawing Sheets

FIG. 1

| INDEX | HOST | NODE IDENTIFIER | |
|---|---|---|---|
| LITERATURE, SPORT | SERVER 1 | node 001 | ~21 |
| COOKING, LITERATURE | SERVER 1 | node 010 | ~22 |
| SPORT, ENTERTAINMENT | SERVER 1 | node 050 | ~23 |
| ENTERTAINMENT, LITERATURE | SERVER 2 | node 030 | ~24 |
| SPORT, COOKING | SERVER 2 | node 040 | ~25 |

HYPERMEDIA SYSTEM

BACKGROUND OF THE INVENTION

1. Field of the Invention

The present invention relates to a hypermedia system used in a network environment, and more particularly to a hypermedia system for managing node link information intensively by use of a directory server provided in a network.

2. Description of the Prior Art

In recent years, a system called a hypermedia system has attracted considerable attention as a management technique of information in computers. The hypermedia system directly associates data files whose contents are related each other to process multi-media data including image data and voice data as well as text data based on a hypertext structure in which data is retrievable interactively without being aware of file names. Hereinafter, a data file treated here is referred to as a node.

Figure 8:
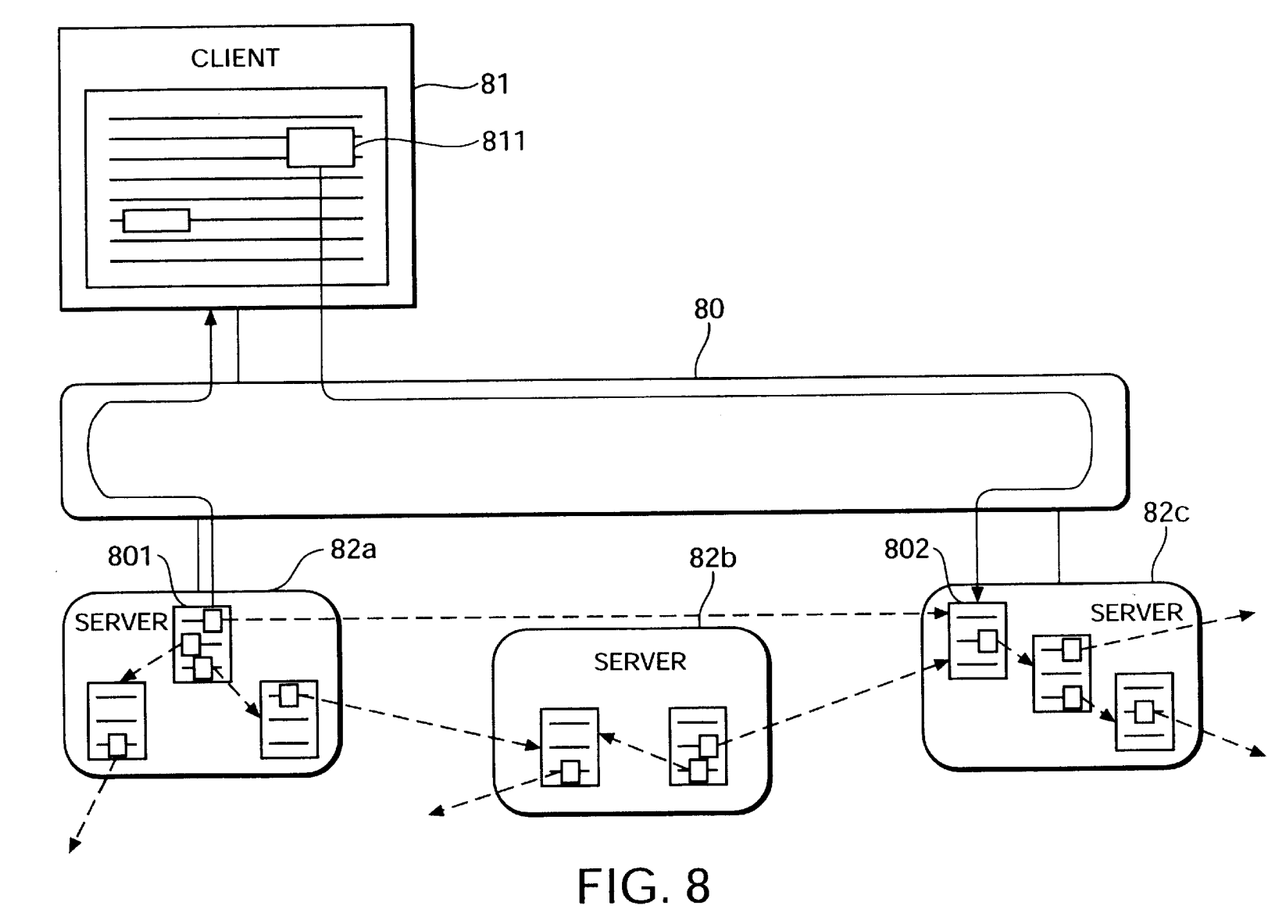
FIG. 8 is a block diagram of a conventional hypermedia system.

As a hypermedia system in a network environment, for example, the World-Wide Web as disclosed in a paper entitled, "The World-Wide Web" published in the Communication of the ACM, Vol. 37, No. 8, pp. 76–82, issued August 1994 is prevailing. FIG. 8 illustrates a construction of this type of conventional hypermedia system.

As shown in the figure, a conventional hypermedia system includes a client computer 81 (hereinafter, simply, referred to as a client) and server computers 82a to 82c (hereinafter, simply, referred to as a server) connected via a network 80. The client 81 and the servers 82 store a plurality of contents files for storing contents of nodes such as a hypertext. The location of each contents file is specified by a node identifier (in the above-mentioned World-Wide Web, a node identifier called a URL (uniform resource locator) is used). In FIG. 8, each arrow indicated by a solid line indicates a data flow and each arrow indicated by a dashed line indicates the connection relationship between two nodes.

The client 81 accesses one of the servers 82a to 82c in the network 80 on the basis of a node identifier specified by a user and obtains a contents file of a node indicated by the node identifier to output the contents. For example, if the node identifier of a contents file 801 of the server 82a is specified in FIG. 8, the client 81 achieves the contents file 801 from the server 82a and displays its contents (such as texts) on a display screen. The displayed contents file 801 includes a definition of an anchor area 811, whose designation specifies the node identifier of a contents file 802 associated with this area. Then, the client 81 accesses the server 82b in the network 80 and obtains the contents file 802 to output its contents.

Additionally, the Japanese Patent Disclosure (Kokai) No. 7-44447 discloses a construction in which a hypertext apparatus existing in a host in a network inquires the location of a contents file from a directory server and then accesses the desired contents file, by use of the directory server provided for managing the titles and locations of contents files in the network so as to intensively manage the contents files scattered in the network.

The hypermedia system shown in FIG. 8, however, cannot know information about the contents of a contents file nor link data contained in a node specified by the client until it reads the contents file of the node. In addition, also as described in the Japanese Patent Disclosure (Kokai) No. 7-44447, the directory server manages the locations of contents files only, but cannot know the contents of the contents files nor the connection relationship between nodes.

To proceed with navigation efficiently, it is necessary to easily grasp the entire hypermedia structure composed of node data scattered in the network and link data indicating the connection relationship between nodes and also information about the contents of respective nodes to some extent. In the above conventional techniques, however, it is required to read nodes one by one to follow links, in order to grasp the contents of the nodes, and therefore, it has the disadvantage of requiring a large number of operation times and an enormously-long processing time.

Therefore, a first object of the present invention is to provide a hypermedia system which improves the efficiency of users' navigation works in a network environment.

Further, if a directory server is prepared for managing node link information intensively, it is required to update directory information of the directory server whenever node data or link data is updated on each server, which puts an increased burden on a server manager.

Therefore, a second object of the present invention is to provide a hypermedia system having a means for updating directory information on a directory server efficiently.

Still further, if directory information is updated with each server regularly checked by a directory server, there is a concentration of checks on node data and link data and of the extraction processing of the directory information, which puts an increased load on a host in which the directory server is working if there are a larger number of servers or link data of nodes on the servers.

Therefore, a third object of the present invention is to provide a hypermedia system which reduces a load in data updating in servers.

SUMMARY OF THE INVENTION

According to an aspect of the present invention, there is provided a hypermedia system which comprises: a client computer, server computers for holding contents files, and a directory server computer for intensively managing information about the contents files, the computers being connected via a network. The directory server computer includes: a directory information storage means for storing node identifiers, information about the contents of the contents files which are nodes, and information about the linking relationship between the nodes with respect to the nodes managed by the server computer; and a retrieval means for retrieving information stored in the directory information storage means based on a request from the client computer and sending it to the client.

According to another aspect of the present invention, there is provided a recording medium recording thereon a program for enabling a directory server computer having a directory information storage means for storing node identifiers, information about the contents of contents files which are nodes, and information about the linking relationship between the nodes with respect to the nodes managed by a server computer for holding the contents files to execute retrieval processing of retrieving information stored in the directory information storage means based on a request from a client computer and sending it to the client computer.

BRIEF DESCRIPTION OF THE DRAWINGS

Other features and advantages will be apparent from the following detailed description when taken in conjunction with the accompanying drawings, in which.

In the drawings, the same reference numerals represent the same structural elements.

DETAILED DESCRIPTION OF THE PREFERRED EMBODIMENTS OF THE INVENTION

Preferred embodiments of the invention will be described below in detail referring to the accompanying drawings.

Figure 1:
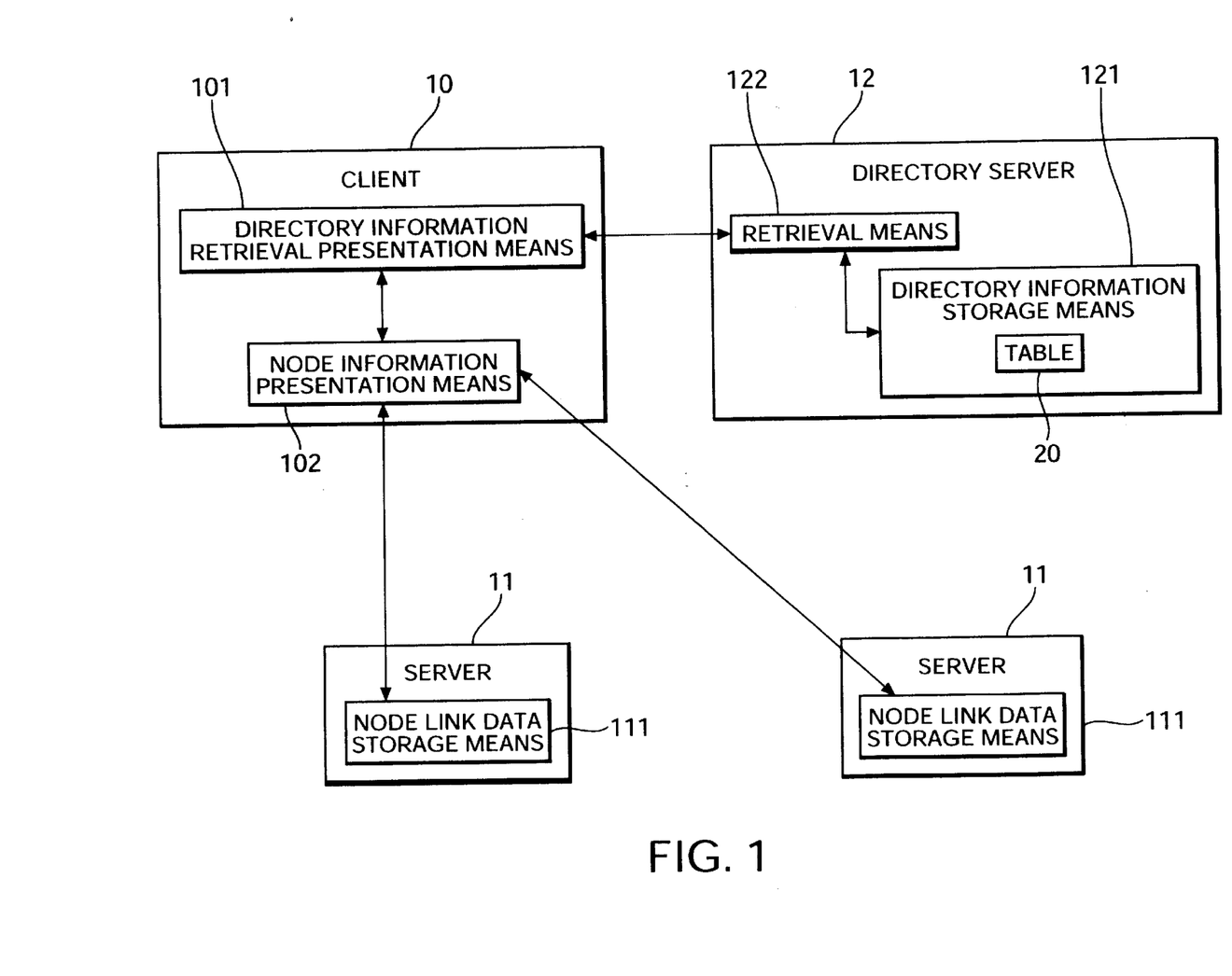
FIG. 1 is a block diagram of a first embodiment of the invention.

FIG. 1 is a block diagram illustrating the construction of a first embodiment of the hypermedia system of the invention.

Referring to FIGS. 1, the first embodiment comprises a client computer 10, server computers 11 for holding contents files, and a directory server computer 12 for managing information about contents files intensively. These are connected via a network. In this figure, a portion distinctive to the invention only is shown, while the other portions which do not directly relate to the invention are omitted.

The client 10 operates under a program control. This program allows the client 10 to function as a directory information retrieval presentation means 101 requesting that the directory server 12 retrieve information and presenting information obtained from the directory server 12, and as a node information presentation means 102, for outputting the contents of a contents file of a node obtained from the server 11. The client 10 includes a display unit.

The server 11 operates under a program control. The servers 11, in the same manner as a server in a conventional hypermedia system, store contents files and includes node link data storage means 111 for managing the node identifiers of the contents files. The node link data storage means 111 is realized by a storage unit such as a magnetic disk unit.

The directory server 12 includes a directory information storage means 121 for storing the node identifier, the information about the contents of a contents file which is a node, and link information of the node (hereinafter, these kinds of information is referred to as node data) for each node managed by each server 11. The directory server 12 operates under a program control. This program allows the directory server 12 to serve as a retrieval means 122 for retrieving information of the directory information storage means 121 in accordance with a request from the client. The directory information storage means 121 is realized by a storage unit such as a magnetic disk unit.

Figure 2:
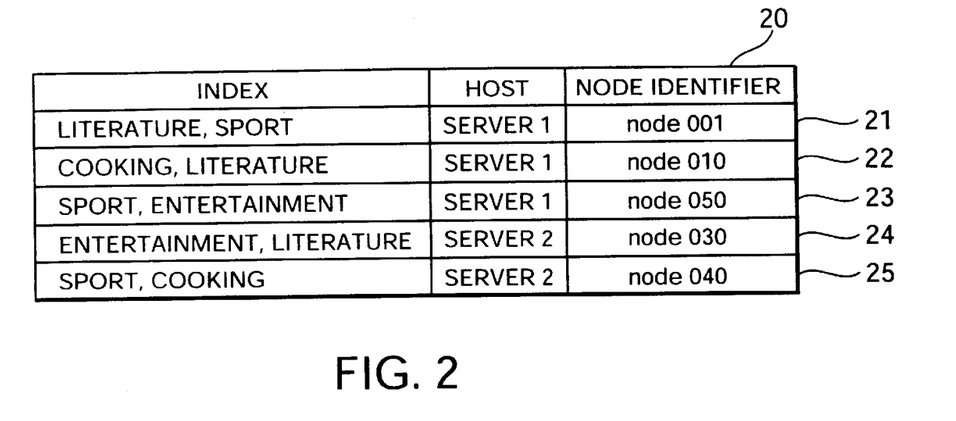
FIG. 2 is a table illustrating the data structure of information stored in a directory information storage means of the first embodiment.

FIG. 2 is a table illustrating an example of the data structure of information stored in the directory information storage means 121.

As shown in the figure, a table 20 includes columns of, at least, node identifiers, indexes each indicating a genre of the contents of a contents file corresponding to a node identifier, and the names of servers in which the contents files which are the nodes are stored. With the table 20 stored in the directory information storage means 121, it becomes possible to find out a desired contents file easily by accessing the directory server 12, rather than the server 11 in which the node is stored, and referring to the table 20 in the directory information storage means 121.

Next, a description will be given below of an operation of the embodiment by using the table 20. A processing flow will be described in the case that the node having the index including a key word specified by a user is referred to display the contents of a contents file of the selected node.

First, it is assumed that the user has entered "sport" as a retrieval key. The directory information retrieval presentation means 101 of the client 10 requests the retrieval means 122 of the directory server 12 to send directory information including the retrieval key "sport".

The retrieval means 122 refers to the table 20 stored in the directory information storage means 121, selects pairs of host names and node identifiers in entires 21, 23, and 25 in the table 20, that is (Server 1, node001),(Server 1, node050), and (Server 2, node040) including the retrieval key "sport" in the index data in the index column, and then sends them to the client 10.

Figure 3:
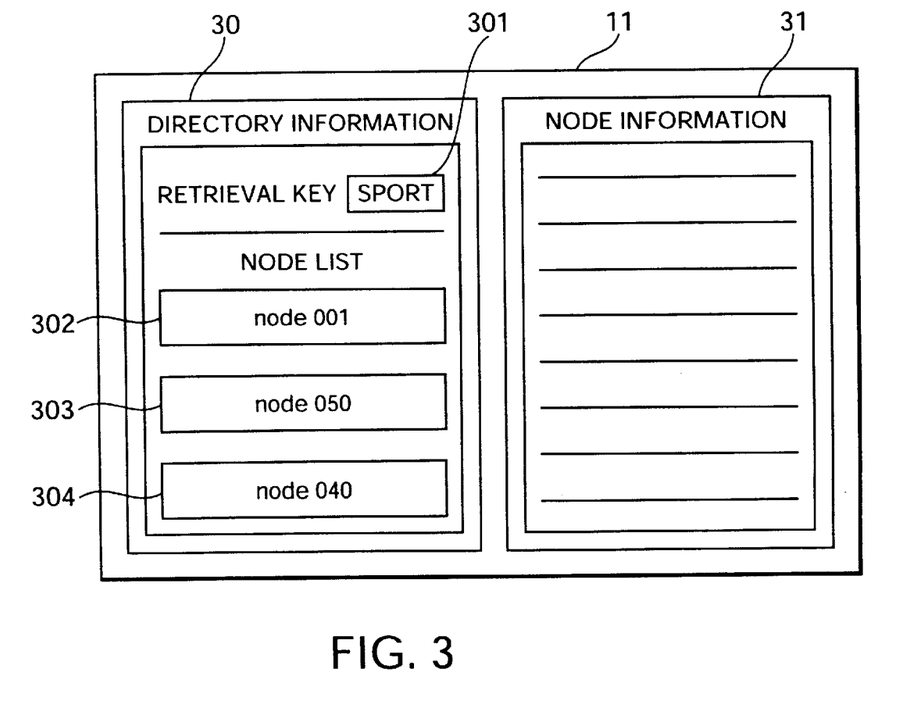
FIG. 3 is a diagram illustrating a display example corresponding to the data structure in FIG. 2 on a client display screen of the first embodiment.

The directory information retrieval presentation means 101 of the client 10 accepts the directory information from the retrieval means 122 and extracts only the node identifiers to display them as labels. FIG. 3 shows a display example of the display screen of the client 10. As shown in the figure, a display screen 11 has a directory information display area 30 and a node information display area 31. The directory information display area 30 includes a retrieval key display field 301 and a node listing field for displaying node identifiers as labels 302 to 304; the entered "sport" is displayed in the retrieval key display field 301 and the node identifiers are displayed as the labels 302 to 304 in the node listing field.

If the user selects the label 303 in this state, the directory information retrieval presentation means 101 notifies the node information presentation means 102 that a node having the node identifier of "node050" and the host name of "Server 1" is selected. The node information presentation means 102 requests the node link data storage means 111 of the server 11 having the host name "Server 1" to transmit the contents file which is the node having the node identifier "node050".

The node link data storage means 111 of the server 11 accepts the transmission request from the node information presentation means 102, retrieves the contents file having the specified node identifier "node050", and then transfers it to the client 10.

The node information presentation means 102 of the client 10 accepts the contents file transmitted from the server 11 and then displays it on the display screen 11. As shown in FIG. 3, the obtained contents file is displayed in the node information display area 31 on the display screen 11 of the client 10. In this embodiment, although the directory information display area 30 and the node information display area 31 are displayed on a single screen as shown in the figure, it is also possible to display pieces of the information on separate display units, respectively.

Figure 4:
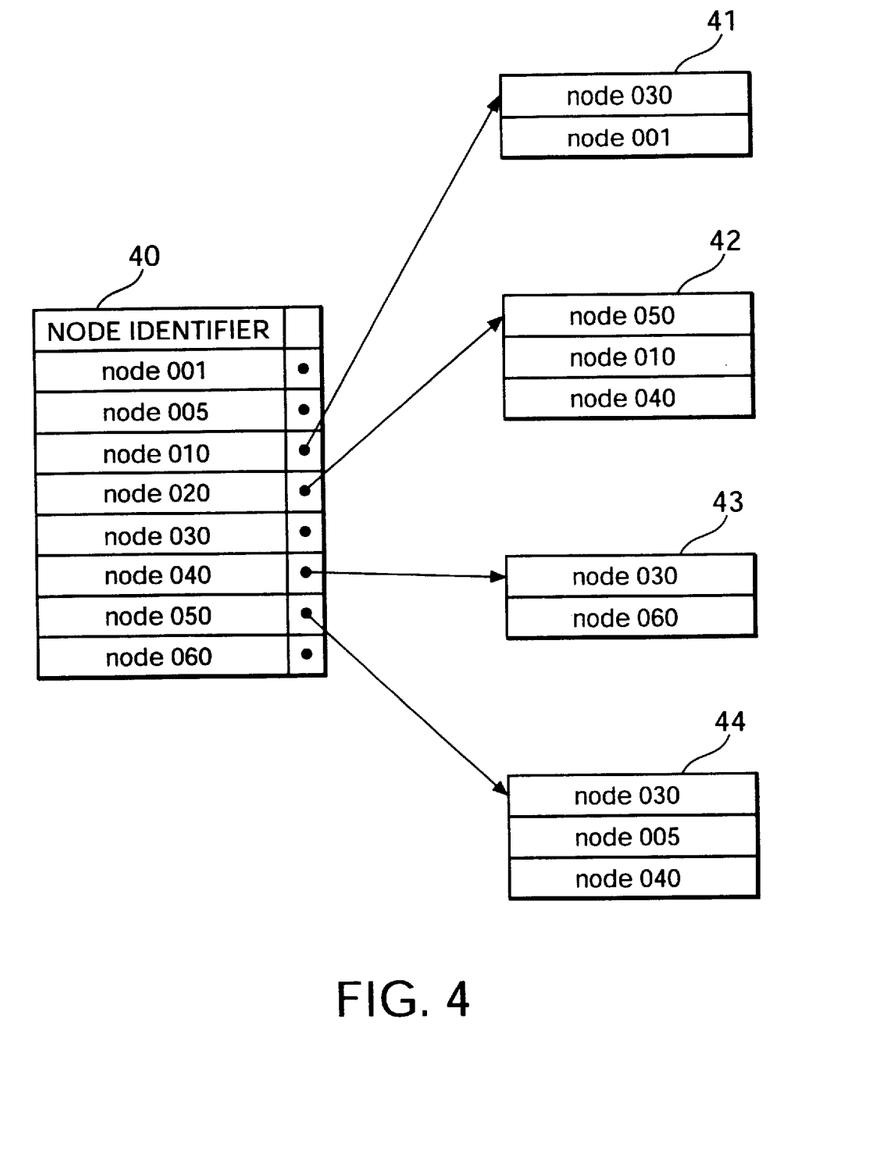
FIG. 4 is a table illustrating another data structure of information stored in the directory information storage means of the first embodiment.

FIG. 4 is a table showing another example of the data structure of information stored in the directory information storage means 121 of the directory server 12.

As shown in the figure, the data structure is composed of a primary table 40 and secondary tables 41 to 44. The primary table 40 is a listing of the node identifiers of the nodes existing in the network, and pointers to the secondary tables 41, 42, 43, and 44.

Subsequently, a description will be given below of an operation of the embodiment, with the tables 40 to 44 being used. The following describes a processing flow in the case that other nodes connected to the contents files which is displayed in the node information display area 31 is displayed on the display screen in the directory information display area 30.

Figure 5:
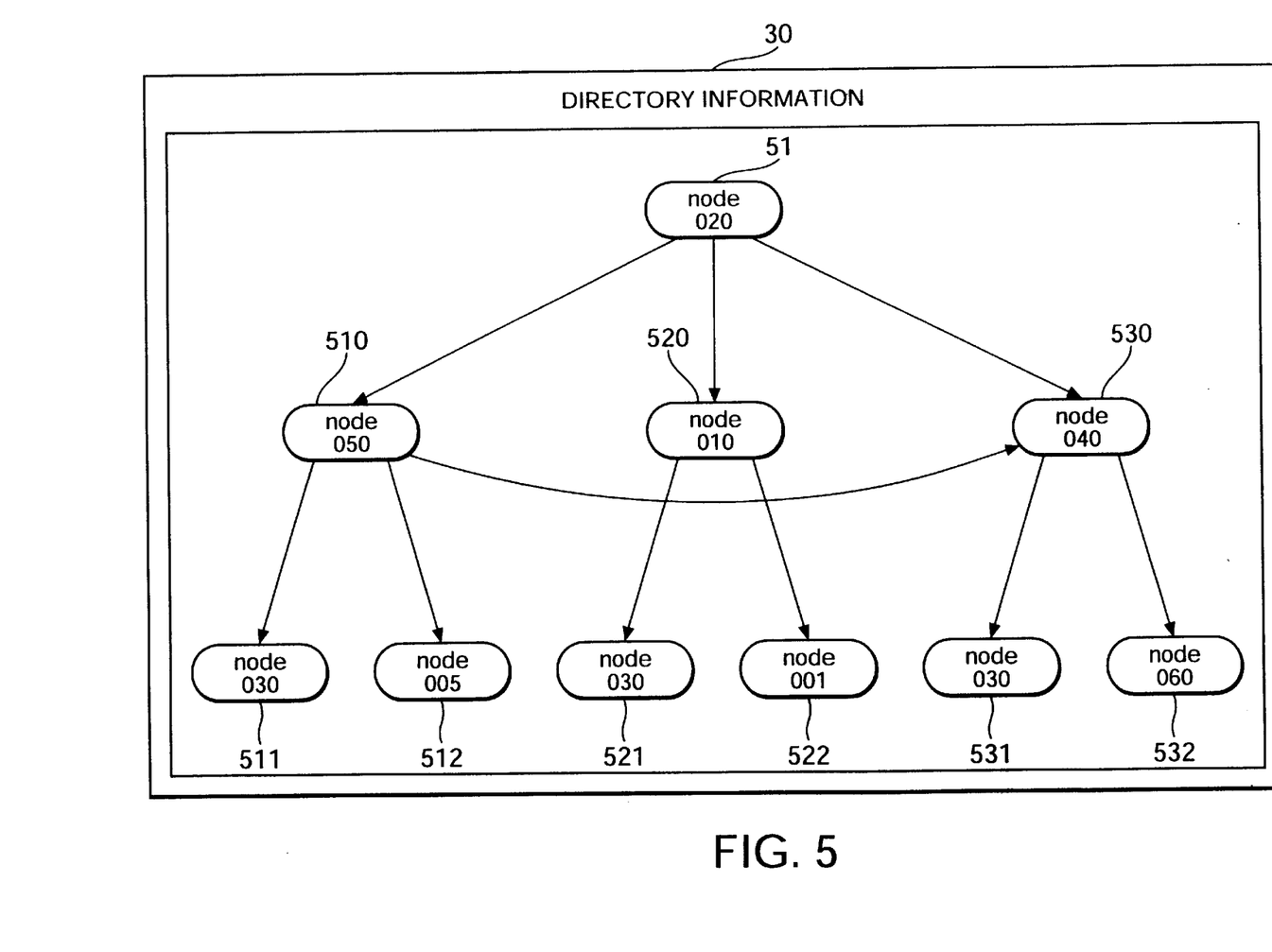
FIG. 5 is a diagram illustrating a display example corresponding to the data structure in FIG. 4 on the client display screen of the first embodiment.

The directory information retrieval presentation means 101 of the client 10 displays on the area 30 the node corresponding to a contents file being displayed in the node information display area 31 and notifies the node identifier "node020" to the directory server 12.

The retrieval means 122 of the directory server 12 accepts the notice and refers to the table 40 stored in the directory information storage means 121 to obtain the table 42 linked to the "node020". After that, it transmits the node identifiers of "node050", "node010", and "node040" stored in the table 42 to the client 10. Further, the retrieval means 122 obtains the tables 44, 41, and 43 linked to the node identifiers of "node050", "node010", and "node040", respectively, and then transmits the node identifiers in the respective tables to the client 10. Although this processing can be repeated as long as node links are continued, it is also possible to stop it in an appropriate phase in consideration for a case that there are an enormously-large number of the linked nodes or that the node links form loops. In this case, the processing is repeated based on a rule, for example, that the processing is stopped with obtaining node identifiers by the number of nodes which can be displayed at a time according to the display size of the directory information display area 30.

The directory information retrieval presentation means 101 of the client 10 accepts the transmitted node identifiers, displays nodes 510, 520, and 530 in the directory information display area 30 as the descendants of the node 51 which has been already displayed, and further displays nodes 511 and 512, nodes 521 and 522, nodes 531 and 532 as the descendants of the nodes 510, 520, and 530, respectively.

Next, if the user selects one of the nodes displayed in the directory information display area 30, its node identifier is notified to the node information presentation means 102 and the contents files displayed by the node information presentation means 102 are updated.

With the above processing procedure repeated recursively, the contents files can be obtained and displayed by following links by the number of the contents files on the display screen of the client 10.

Figure 6:
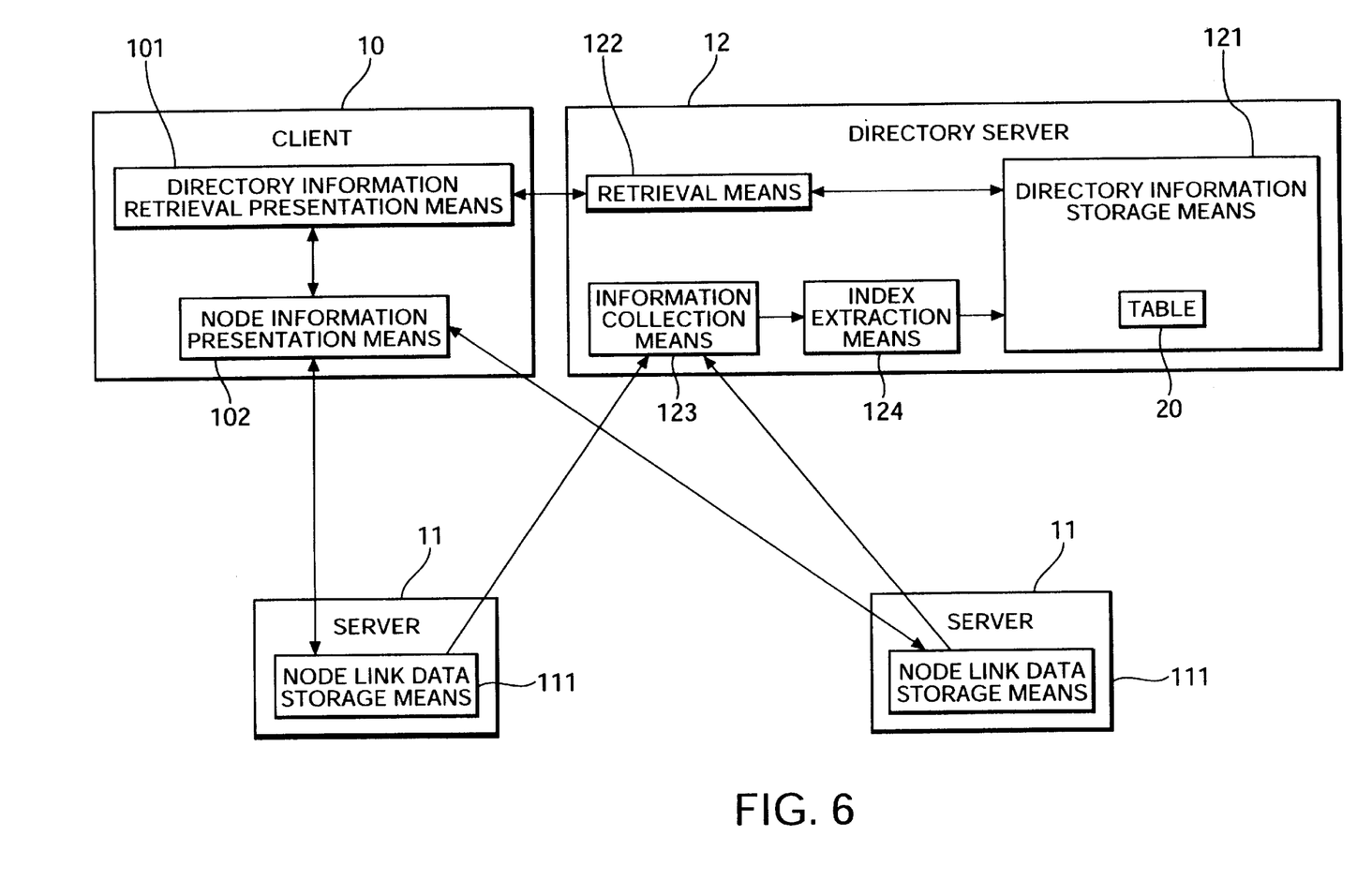
FIG. 6 is a block diagram of a second embodiment of the invention.

FIG. 6 is a block diagram illustrating the construction of a second embodiment of the hypermedia system of the invention.

As shown in the figure, the embodiment comprises a client 10, servers 11 each having a node link data storage means 111, and a directory server 12 having a directory information storage means 121. The client 10 operates under a program control. This program allows the client 10 to serve as a directory information retrieval presentation means 101 and a node information presentation means 102. The directory server 12 operates under a program control. This program allows the server 12 to serve as a directory information storage means 121, a retrieval means 122, an information collection means 123, and an index extraction means 124. The respective means, other than the information collection means 123 and the index extraction means 124, are the same as those in the first embodiment shown in FIG. 1 and therefore their explanation is omitted here. In addition, only a portion distinctive to the invention is shown in the figure and the other portions which do not directly relate to the invention are omitted here.

The information collection means 123 is connected to each server 11 via a network. Node data stored in each server 11 is obtained by searching for a previously-specified server 11 A search for the server 11 by means of the information collection means 123 can be performed either regularly at predetermined time intervals or following a command input or the like from an operator. Additionally, if a change is detected in node data in any server 11 as a result of monitoring the respective servers 11 at all times through the information collection means 123, the node data can be obtained by utilizing the change as a condition.

The index extraction means 124 extracts index information from the node data obtained by the information collection means 123 and stores it into the directory information storage means 121. As the index information, it is possible to select a genre of the contents of the contents files as shown in the table 20 in FIG. 2 or various information such as key word indexes. If the node data includes link information, it is possible to extract node link information and to store it into the directory information storage means.

Figure 7:
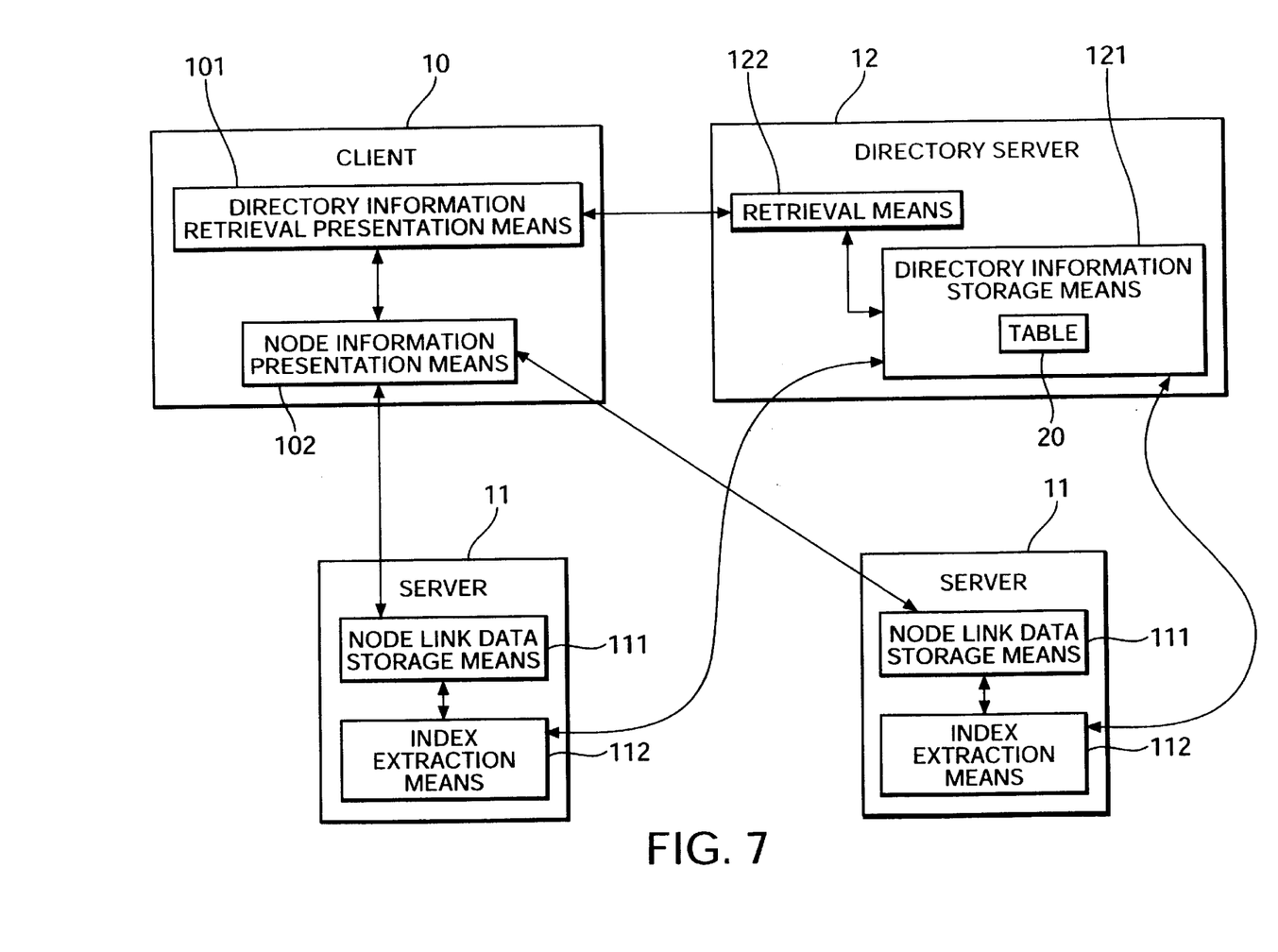
FIG. 7 is a block diagram of a third embodiment of the invention.

FIG. 7 is a block diagram illustrating the construction of a third embodiment of the hypermedia system of the invention.

As shown in the figure, the embodiment comprises a client 10 having a directory information retrieval presentation means 101 and a node information presentation means 102, servers 11 each having a node link data storage means 111 and an index extraction means 112, and a directory server 12 having a directory information storage means 121 and a retrieval means 122. The respective means other than the index extraction means 112, are the same as those in the first embodiment shown in FIG. 1 and therefore their explanation is omitted here. In addition, only a portion distinctive to the invention is shown in the figure and the other portions which do nor directly relate to the invention are omitted here.

The index extraction means 112 is connected to the directory information storage means 111 of the directory server 12 via a network. If node data stored in the node link data storage means 111 is updated in any one of the servers 11, the index extraction means 112 extracts index information from the node data, transmits it to the directory server 12, and then enters it in the directory information storage means 121. As index information, it is possible to select a genre of the contents of the contents files as shown in the table 20 in FIG. 2 or various information such as key word indexes. In addition, if the node data includes link information, it is possible to extract the node link information and to store it into the directory information storage means.

While the invention has been described in terms of the preferred embodiments, it is to be understood that the invention is not limited to the above embodiments. For example, although the above description has been given of storing the information about the contents of the contents files as shown in FIG. 2 and of storing the link information between nodes as shown in FIG. 4 as information stored in the index information storage means of the directory server, it is also possible to store both of the pieces of information in the index information storage means so that a user can select arbitrary information to use it.

As described above, the invention intensively manages information about the contents of contents files or information about links of nodes in a directory server provided in a network, and therefore a user can obtain information about a desired node by accessing the directory server rather than the server in which the desired node is stored. As a result, the invention has the advantage of being capable of improving the efficiency of navigation works performed by the user.

In addition, the invention has the advantages of being capable of reducing the time and labor for updating information in the directory server whenever node data in the server is updated by including an information collection means for obtaining node data updated automatically by checking respective servers and an index extraction means for updating node data of the node entered in the directory server.

Furthermore, the invention has the advantage that the burden on the directory server can be reduced if node data of the node stored in the server is updated, with each server equipped with an index extraction means for extracting updated node data to transmit it to the directory server.

What is claimed is:

1. A hypermedia system comprising a client computer, server computers for holding contents files, and a directory server computer for intensively managing information about said contents files, said computers being connected via a network, said directory server computer including:
    a directory information storage means for storing node identifiers, information about the contents of said contents files which are nodes, and information about the linking relationship between said nodes with respect to said nodes managed by said server computers; and
    a retrieval means for retrieving information stored in said directory information storage means based on a request from said client computer and sending it to said client computer,
    wherein said directory information storage means comprises:
        primary table which holds a listing of said node identifiers corresponding to said nodes existing in said network;
        secondary tables each containing a group of nodes associated to a node;
        pointers to said secondary tables each containing said group of nodes associated to a node for a node identifier in said primary table; and
        a table having said node identifiers, indexes indicating genres of the contents of said contents files corresponding to said node identifiers, and the names of those server computers in which said contents files corresponding to said node identifiers are stored.

2. A hypermedia system claimed in claim 1, wherein said directory server computer further includes:
    an information collection means for obtaining updated data in said nodes by checking each of said server computers automatically; and
    an index extraction means for updating data relating to the corresponding node registered in said directory server computer based on said updated data obtained by said information collection means.

3. A hypermedia system claimed in claim 2, wherein said directory information storage means stores a table including said node identifiers, indexes indicating genres of the contents of said contents files corresponding to said node identifiers, and the names of those server computers in which said contents files corresponding to said node identifiers are stored.

4. A hypermedia system claimed in claim 2, wherein said directory information storage means comprises a primary table which holds a listing of said node identifiers corresponding to said nodes existing in said network and secondary tables each containing a group of nodes associated to a node, and stores pointers to said secondary tables each containing said group of nodes associated to a node for a node identifier in said primary table.

5. A hypermedia system claimed in claim 1, wherein said server computers further include an index extraction means for extracting the updated data and transmit it to said directory server computer if data relating to a node stored in said server computers is updated.

6. A hypermedia system claimed in claim 5, wherein said directory information storage means stores a table including said node identifiers, indexes indicating genres of the contents of said contents files corresponding to said node identifiers, and the names of those server computers in which said contents files corresponding to said node identifiers are stored.

7. A hypermedia system claimed in claim 5, wherein said directory information storage means comprises a primary table which holds a listing of said node identifiers corresponding to said nodes existing in said network and secondary tables each containing a group of nodes associated to a node, and stores pointers to said secondary tables each containing said group of nodes associated to a node for a node identifier in said primary table.

8. A directory server computer comprising:
    a directory information storage means for storing node identifiers, information about the contents of contents files which are nodes, and information about the linking relationship between said nodes with respect to said nodes managed by a server computer holding said contents files; and
    a retrieval means for retrieving information stored in said directory information storage means based on a request from a client computer,
    wherein said directory information storage means comprises:
        a primary table which holds a listing of said node identifiers corresponding to said nodes existing in a network connected to said directory server computer;
        secondary tables each containing a group of nodes associated to anode;
        pointers to said secondary tables each containing said group of nodes associated to a node for a node identifier in said primary table; and
        a table having said node identifiers, indexes indicating genres of the contents of said contents files corresponding to said node identifiers, and the names of those server computers in which said contents files corresponding to said node identifiers are stored.

9. A directory server computer claimed in claim 8 further comprising: an information collection means for obtaining updated data in said nodes by checking each server computer automatically; and an index extraction means for updating data relating to the corresponding node registered in the directory server computer based on said updated data obtained by said information collection means.

10. A directory server computer claimed in claim 9, wherein said directory information storage means stores a table having said node identifiers, indexes indicating genres of the contents of said contents files corresponding to said node identifiers, and the names of those server computers in which said contents files corresponding to said node identifiers are stored.

11. A directory server computer claimed in claim 9, wherein said directory information storage means comprises a primary table which holds a listing of said node identifiers corresponding to said nodes existing in a network connected to said directory server computer and secondary tables each containing a group of nodes associated to a node and stores pointers to said secondary tables each containing said group of nodes associated to a node for a node identifiers in said primary table.

12. A hypermedia system comprising a client computer, server computers for holding contents files, and a directory server computer for intensively managing information about said contents files, said computers being connected via a network, said directory server computer including:
    a directory information storage means for storing node identifiers, information about the contents of said contents files which are nodes, and information about the linking relationship between said nodes with respect to said nodes managed by said server computers; and
    a retrieval means for retrieving information stored in said directory information storage means based on a request from said client computer and sending it to said client computer,
    wherein said directory server computer further includes:
        an information collection means for obtaining updated data in said nodes by checking each of said server computers automatically; and
        an index extraction means for updating data relating to the corresponding node registered in said directory server computer based on said updated data obtained by said information collection means,
    wherein said directory information storage means comprises:
        a primary table which holds a listing of said node identifiers corresponding to said nodes existing in said network;
        secondary tables each containing a group of nodes associated to a node;
        pointers to said secondary tables each containing said group of nodes associated to a node for a node identifier in said primary table; and
        a table having said node identifiers, indexes indicating genres of the contents of said contents files corresponding to said node identifiers, and the names of those server computers in which said contents files corresponding to said node identifiers are stored.

13. A hypermedia system comprising a client computer, server computers for holding contents files, and a directory server computer for intensively managing information about said contents files, said computers being connected via a network, said directory server computer including:
    a directory information storage means for storing node identifiers, information about the contents of said contents files which are nodes, and information about the linking relationship between said nodes with respect to said nodes managed by said server computers; and
    a retrieval means for retrieving information stored in said directory information storage means based on a request from said client computer and sending it to said client computer,
    wherein said server computer further includes an index extraction means for extracting the updated data and transmit it to said directory server computer if data relating to a node stored in said server computers is updated,
    wherein said directory information storage means comprises:
        a primary table which holds a listing of said node identifiers corresponding to said nodes existing in said network;
        secondary tables each containing a group of nodes associated to a node;
        pointers to said secondary tables each containing said group of nodes associated to a node for a node identifier in said primary table; and
        a table having said node identifiers, indexes indicating genres of the contents of said contents files corresponding to said node identifiers, and the names of those server computers in which said contents files corresponding to said node identifiers are stored.

14. A directory server computer comprising:
    a directory information storage means for storing node identifiers, information about the contents of contents files which are nodes, and information about the linking relationship between said nodes with respect to said nodes managed by a server computer holding said contents files;
    a retrieval means for retrieving information stored in said directory information storage means based on a request from a client computer;
    an information collection means for obtaining updated data in said nodes by checking each server computer automatically; and
    an index extraction means for updating data relating to the corresponding node registered in the directory server computer based on said updated data obtained by said information collection means,
    wherein said directory information storage means comprises:
        a primary table which holds a listing of said node identifiers corresponding to said nodes existing in a network connected to said directory server computer;
        secondary tables each containing a group of nodes associated to a node;
        pointers to said secondary tables each containing said group of nodes associated to a node for a node identifier in said primary table; and
        a table having said node identifiers, indexes indicating genres of the contents of said contents files corresponding to said node identifiers, and the names of those server computers in which said contents files corresponding to said node identifiers are stored.

* * * * *